United States Patent
Tkaczyk

(10) Patent No.: US 7,696,481 B2
(45) Date of Patent: Apr. 13, 2010

(54) MULTI-LAYERED DETECTOR SYSTEM FOR HIGH RESOLUTION COMPUTED TOMOGRAPHY

(75) Inventor: John Eric Tkaczyk, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 259 days.

(21) Appl. No.: 11/286,122

(22) Filed: Nov. 22, 2005

(65) Prior Publication Data

US 2007/0114426 A1 May 24, 2007

(51) Int. Cl.
*G01T 1/161* (2006.01)
*H01L 27/146* (2006.01)

(52) U.S. Cl. .............. 250/363.02; 250/370.09
(58) Field of Classification Search ............ 250/363.02, 250/370.09
See application file for complete search history.

(56) References Cited

U.S. PATENT DOCUMENTS

| | | | | |
|---|---|---|---|---|
| 4,618,773 A | * | 10/1986 | Drukier | 250/363.02 |
| 5,138,167 A | * | 8/1992 | Barnes | 250/370.01 |
| 5,629,968 A | * | 5/1997 | Trauernicht | 378/98.8 |
| 6,069,361 A | * | 5/2000 | Rubinstein | 250/370.11 |
| 6,393,092 B1 | | 5/2002 | Yoshida | |
| 6,445,765 B1 | * | 9/2002 | Frank et al. | 378/56 |
| 6,707,046 B2 | | 3/2004 | Possin et al. | |
| 7,010,092 B2 | * | 3/2006 | Winsor | 378/98.9 |
| 7,012,259 B2 | * | 3/2006 | Nam et al. | 250/370.09 |
| 7,081,627 B2 | * | 7/2006 | Heismann et al. | 250/370.11 |
| 2003/0095629 A1 | | 5/2003 | Nascetti et al. | |
| 2004/0200971 A1 | * | 10/2004 | De Keyser | 250/370.09 |
| 2006/0032919 A1 | * | 2/2006 | Shearin | 235/454 |
| 2007/0121783 A1 | * | 5/2007 | Ellenbogen et al. | 378/57 |

FOREIGN PATENT DOCUMENTS

WO  WO 2004095068 A1 * 11/2004

* cited by examiner

*Primary Examiner*—David P Porta
*Assistant Examiner*—Carolyn Igyarto
(74) *Attorney, Agent, or Firm*—Jason K. Klindtworth

(57) ABSTRACT

X-ray detector system 18 with improved spatial resolution for a computed tomography systems is provided. Detector system 18 may include pairs of first and second detector arrays 50 and 52, with each array containing detector elements of a different design. In one embodiment, the first array 50 may comprise a first, relatively thin and continuous (i.e., monolithic) scintillation layer 70 with an array of individual diodes 74 positioned to receive light generated within the scintillation layer 70. The second array may comprise a second, relatively thick scintillation layer 80 formed of separate scintillator elements 82. An array of diodes 86 may be positioned to receive radiation from the scintillation layer 80 such that each diode element 82 is aligned to primarily receive radiation from one scintillator element 82 in the layer 80. The structural arrangements of the detector system may also be adapted for applications involving direct conversion of x-ray energy.

15 Claims, 4 Drawing Sheets

MULTI-LAYERED DETECTOR SYSTEM FOR HIGH RESOLUTION COMPUTED TOMOGRAPHY

FIELD OF THE INVENTION

This invention relates to diagnostic imaging and, more particularly, to methods and designs providing improved image quality in computed tomography systems.

BACKGROUND OF THE INVENTION

In digital radiographic imaging systems a source projects a beam of x-rays toward a subject or object under study, such as a patient or a piece of luggage. After being attenuated by the subject or object, the beam impinges on multiple radiation detector elements, each of which produces an electrical signal indicative of beam attenuation. The x-ray detector system typically includes a collimator disposed above the sensing elements for limiting the spread of the x-ray beam before it traverses the sensor media in which x-rays are converted to electrical signals. Typically the detector elements are uniformly spaced apart in a series of arrays along an imaging plane. Resulting electrical signals are processed to render an image formed of discrete pixels, with each pixel having a brightness level based on the signal received from a detector element. Nominally, the limiting spatial resolution of the image formed in a radiographic imaging system is set by the width of the detector elements.

In contemporary computed tomography (CT) systems, the x-ray source and the array of detector elements are rotated on a gantry and around the subject. The CT image is formed by a reconstruction algorithm applied to data acquired on multiple views at different gantry angles. Spatial resolution of the CT image is a function of the detector element size, as a smaller detector size enables an increased number of detector elements per unit area and improved image resolution. However, the relative cross-talk across element boundaries increases as the element size decreases.

Improved spatial resolution of the CT image may also be had by reconstructing an image based on data collected at first and second detector array positions with a complementary arrangement. The second position may be slightly offset with respect to the first position, i.e., offset by a fraction of the spacing between adjacent detector elements. That is, such offset pixel imaging, providing a higher sampling of the incident radiation, renders greater spatial resolution in the reconstructed image. It is typical for a CT system to implement this offset by a quarter-element angular offset of the detector centerline in the gantry system. Data acquired in views 180 degrees (one-half rotation) apart are then complementary with half-element offset.

In an indirect conversion detector system, x-rays are first converted to light in scintillation elements. The scintillation elements are packaged in an array with reflective bonding materials between the elements. Light-responsive diode elements, also formed in an array, are each positioned to receive light energy from an adjacent scintillator element. The diode elements produce electrical signals in response to the level of generated light. That is, each diode element predominantly receives light energy from one scintillator element and generates an electrical signal corresponding primarily to the light energy in that single element. In a direct conversion detector system, semiconductor sensor elements generate the electrical signals without the need for scintillator and diode elements. In both indirect and direct conversion systems, the brightness resulting from each detector element corresponds to the level of incident radiation impinging on that element's area.

In the past, image resolution in CT systems has been a function of cost and dose efficiency. Higher resolution detectors have required denser arrays of smaller detector elements resulting in higher cost. In addition, the area surrounding the perimeter of each detector element is not responsive to x-ray energy and, as detector elements get smaller, the proportion of area on the array which becomes non-contributing to signal generation increases markedly. By way of example, the collimator may block x-rays in the perimeter region and, for an indirect conversion detector system, the reflector-filled gaps between scintillator elements are not x-ray responsive. As the non-responsive portion of a detector system increases, a higher radiation dose must be applied to the imaged object in order to sustain a desired image quality.

Detector systems may also be applied to discriminate the energy of received x-rays. Typically, several signal bins are provided for each detector element. Each bin corresponds to the received x-rays within some specified energy range. Typically, two to five bins are found in such systems. The measurement of x-ray energy provides for characterization of the imaged object's material composition. Material discrimination is possible in such a system in addition to the formation of the conventional CT image.

BRIEF DESCRIPTION OF THE INVENTION

According to one embodiment of the invention, a radiation imaging system includes a source for projecting a beam of x-rays into an imaging region and a detector assembly positionable along an imaging plane. The assembly includes a plurality of detectors with each detector including first and second arrays of detector elements. Each element generates a signal representative of x-ray flux absorbed by a scintillation component. The first array is formed of a monolithic layer of scintillator material and an array of diodes, with each diode positioned to receive energy from a different portion of the scintillation layer to generate an electrical signal responsive to scintillation light. Elements of the second array are positioned to absorb x-rays transmitted through one or more of the elements in the first array. A data acquisition system converts signals generated by elements in each array for processing, and reconstructor circuitry combines converted signals to generate an image based on pixel values derived from the converted signals. Elements of the first and second arrays may be configured as pairs fully aligned with respect to the x-ray source so that each element in a pair is positioned to receive the same solid angle of x-ray flux. Alternately, the pairs of elements in different arrays may be offset with respect to one another by a fixed percent of the center-to-center spacing between elements (pitch) in each array. The system may also include a matrix of collimators either before the two arrays or interposed between elements of the first array and elements of the second array to reduce influence of x-ray energy entering one element in an array on a signal value generated in part by another element in the same array.

A radiation system is also provided wherein a detector assembly, positionable along an imaging plane, is formed of a plurality of detectors with each detector including first and second arrays of detector elements. Each element generates a signal representative of absorbed x-rays according to a characteristic capture field. The first array includes a monolithic layer of scintillator material, portions of which each correspond to the component of a different element in which x-rays are absorbed. In one example embodiment, no element in the first array has the same capture field as an element in the second array and each element of the second array is positioned to absorb x-rays transmitted through two or more elements in the first array. The center-to-center spacing of elements in each array may be the same or a different pitch. Pixel values of an associated image may be based on a combination of at least one signal derived from the first array and at least one signal derived from the second array.

BRIEF DESCRIPTION OF THE DRAWINGS

The above and other aspects of the invention will become more apparent in light of the following detailed description when read in conjunction with the accompanying drawings, wherein.

Wherever appropriate, like reference numbers are used throughout the figures to refer to like parts.

DETAILED DESCRIPTION OF THE INVENTION

Figure 1:
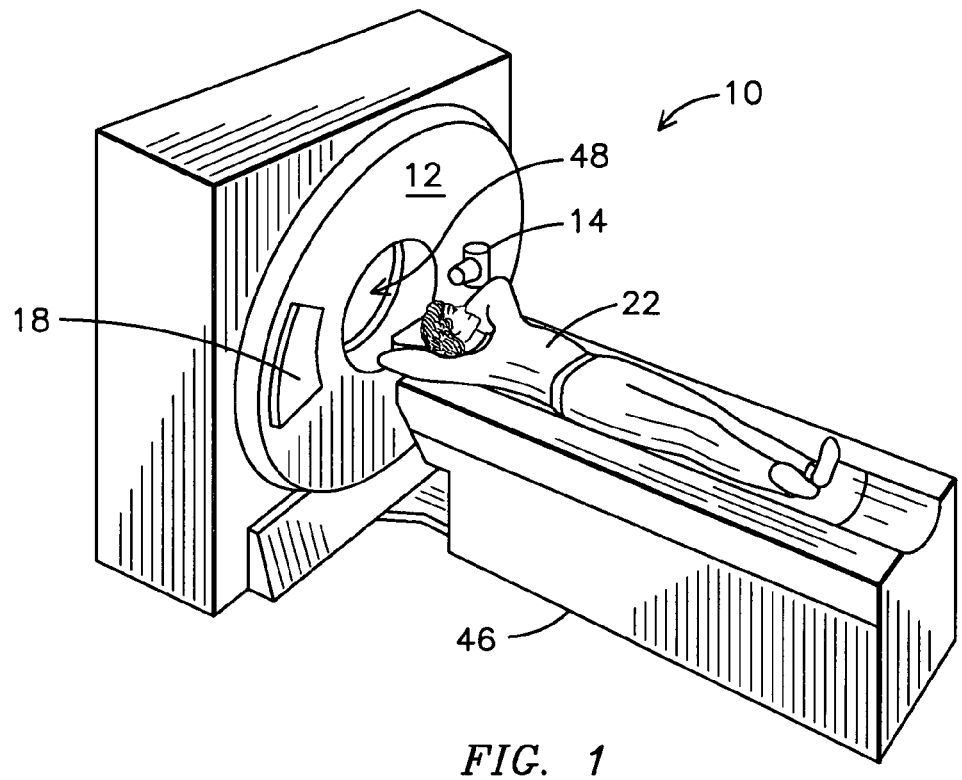
FIG. 1 illustrates a CT imaging system incorporating features of the invention.
Figure 2:
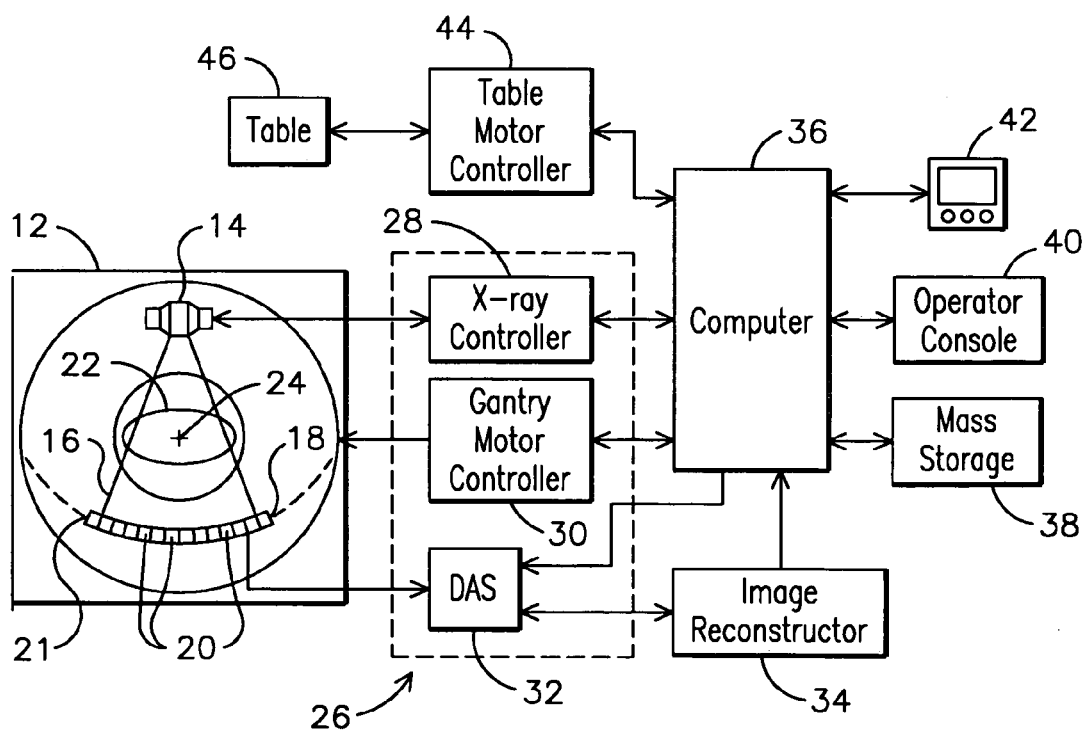
FIG. 2 is a schematic diagram illustrating features of the system shown in FIG. 1.

Referring first to FIGS. 1 and 2, an exemplary computed tomography imaging system 10 that may benefit from aspects of the present invention includes a gantry 12 having an x-ray source 14 that projects a beam of x-rays 16 toward a high resolution detector system 18 on an opposite side of the gantry 12. The high resolution detector system 18 includes a plurality of detector elements 20 formed in a curvilinear array to sense x-rays that traverse through a medical patient 22. Each detector element 20 produces an electrical signal representative of the intensity of that portion of the x-ray beam striking the element, this intensity being indicative of beam attenuation resulting from traversal through the patient. As indicated with hatched lines in FIG. 2, the array of detector elements define a curvilinear image plane 21 coincident with and rotatable with the gantry 12 about a center point 24. For readers desirous of additional background information regarding a CT imaging system, reference is made to U.S. Pat. No. 6,953,935 incorporated herein by reference.

Rotation of the gantry 12 and operation of the x-ray source 14 are governed by a control mechanism 26 which includes an x-ray controller 28, that provides power and timing signals to the x-ray source 14, and a gantry motor controller 30 that controls the rotational speed and position of the gantry 12. A data acquisition system 32 in the control mechanism 26 receives data from the detector elements 20 and converts these to digital signals. An image reconstructor 34 receives the data from the data acquisition system 32 and generates a reconstructed image which is sent to a computer 36 for recording in a mass storage device 38.

The computer 36 also receives commands and scanning parameters from an operator console 40 and a display 42 allows viewing of the reconstructed image and other data from the computer 36. The operator-supplied commands and parameters are used by the computer 36 to provide control signals and information to the data acquisition system 32, the x-ray controller 28 and the gantry motor controller 30. In addition, the computer 36 operates a table motor controller 44 which controls motorized displacement of a table 46 to move portions of the patient 22 through an opening 48 in the gantry 12.

Figure 3:
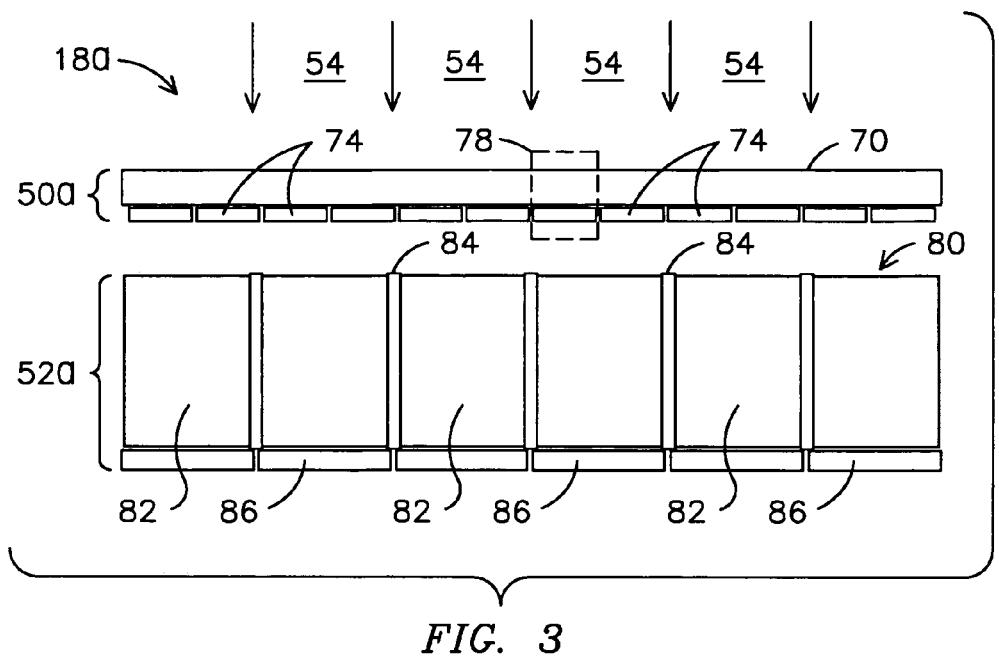
FIGS. 3-5 are cross sectional views of embodiments of detector arrays which may be incorporated in the system of FIG. 1.
Figure 4:
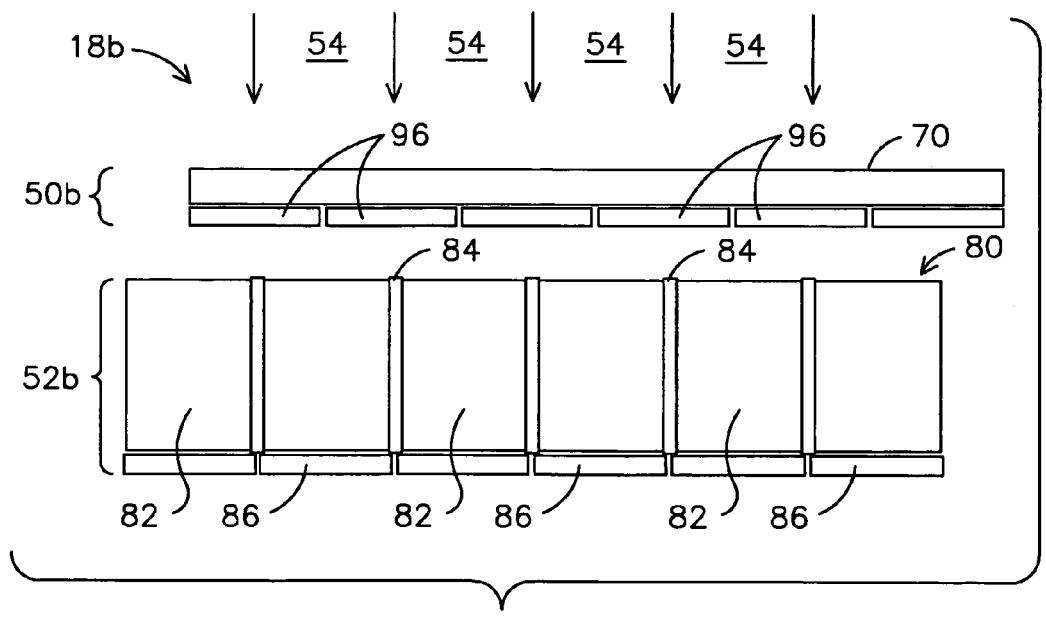
Figure 5:
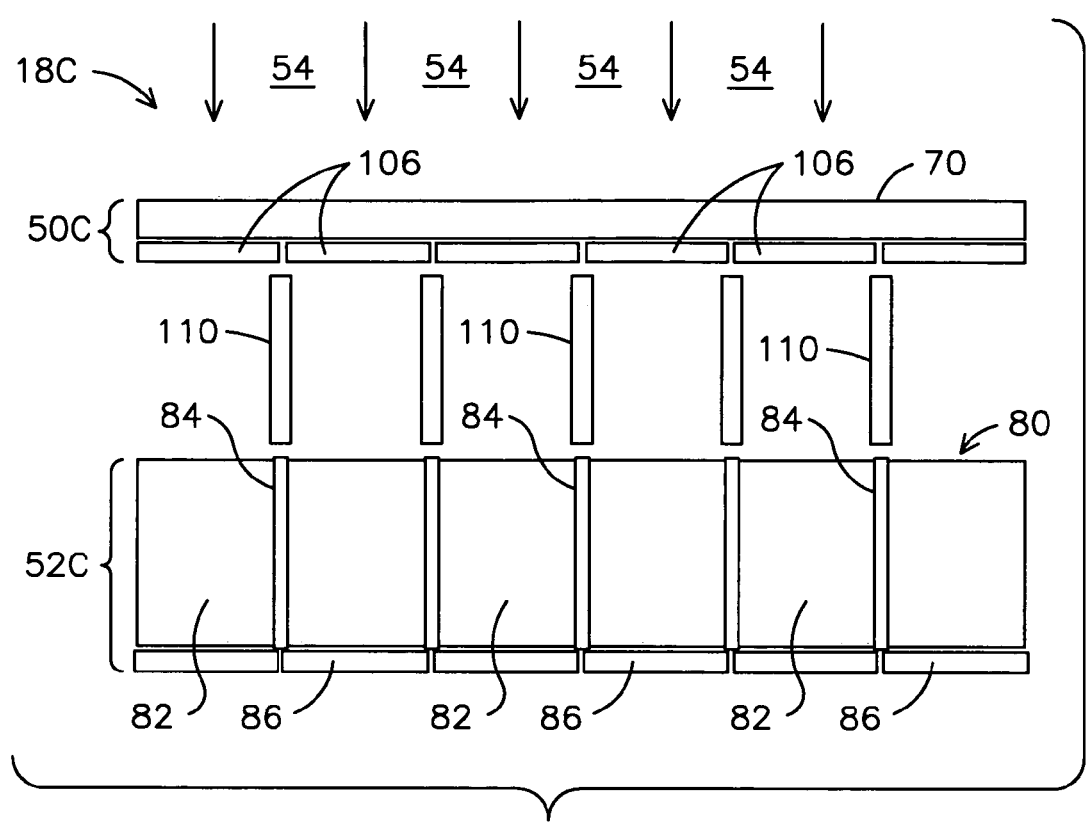

Next, referring generally to FIGS. 3-6, there are shown multiple exemplary embodiments of the detector system 18, referred to herein as system 18a (FIG. 3), system 18b (FIG. 4) and system 18c (FIG. 5). Generally the detector system 18 includes pairs of first and second detector arrays 50 and 52. Elements in each array have a relative alignment with respect to elements in the other array. It is to be understood that while only one pair of detector arrays is illustrated for each embodiment, multiple pairs of the first and second arrays 50 and 52, together, form a larger imaging array of the detector system 18 shown in FIG. 2.

FIGS. 3-5 are partial cross sectional views taken through a single row of elements in the arrays 50 and 52. Although only a small number of elements are shown in the figures, each row contains many more elements. More generally, the numerous embodiments of arrays 50 and 52 may be either one dimensional or two dimensional. The exemplary arrays 50 and 52 illustrated in the figures are two dimensional, each having multiple rows of elements arranged in columns orthogonal to the rows. Arrows 54 generally indicate x-rays traveling from the source 14 and sequentially passing through each array of detector elements. The term thickness, used herein to describe various components in the detector system 18, refers to a length measured in a direction parallel to the arrows 54.

For some embodiments, individual detector elements in one or the other of the arrays 50 and 52 correspond on a one-to-one basis with pixels in the reconstructed image. More generally, in the detector system arrays each detector element 20 has an associated x-ray capture field, i.e., an effective sensing area at a position along the image plane 21. The capture field corresponds to the geometric area of a detector element which subtends a solid angle through which x-rays 16 generate signal information transmitted to the data acquisition system. For simplicity of illustration the capture field may be approximated as a square shape with the distance along one side of the square referred to as the detector width. The resolution of each array of such elements is a function of the center-to-center spacing of such elements, referred to herein as the pitch.

In certain embodiments, pairs of detector elements formed by one element in each array are aligned with respect to the x-ray source 14 such that the capture field of each detector element in the pair is co-aligned with respect to the x-ray source 14. With such alignment each detector element in the pair is centered about the same solid angle of flux from the x-ray source 14 and subtends substantially the same solid angle of flux. Recognizing that one detector element in the pair is slightly closer to the source than the other detector element, detector elements in the pair do not subtend exactly the same solid angle of x-ray flux. However, with the distance between the arrays being on the order of one mm or less, the detector elements subtend nearly, i.e., substantially, the same solid angle.

In other embodiments, multiple elements in the first array 50 will subtend substantially the same solid angle as a single detector element in the array 52. For example, with each array formed with uniform rows and columns of detector elements and with detector elements in the array 50 having half the pitch as detector elements in the second array 52, then four detector elements positioned at the intersection of two adjoining rows and columns of the array 50 will subtend substantially the same solid angle as one detector element in the array 52.

For the illustrated embodiments, a portion, e.g., 60 percent or less, of the x-rays are absorbed by scintillator material in the first detector array 50; and most of the x-rays (e.g., 95 percent or more) which pass into the second detector array 52, are absorbed in the second detector array 52.

According to an exemplary embodiment (see FIG. 3) the detector system 18*a* comprises a first detector array 50*a* and a second detector array 52*a* with each array containing detector elements of a different design, as described in greater detail below.

The first detector array 50*a* comprises a first, relatively thin and continuous (i.e., monolithic) scintillation layer 70 with an array of individual diodes 74 positioned to receive light generated within the scintillation layer 70. The second detector array 52*a* comprises a second, relatively thick scintillation layer 80 formed of separate scintillator elements 82 and having a conventional matrix of reflectors 84 formed at the interfaces between each of the scintillator elements 82. An array of diodes 86 is positioned to receive radiation from the scintillation layer 80 such that each diode 86 is aligned to primarily receive radiation from one scintillator element 82 in the scintillation layer 80.

The diodes 74 and 86 (as well as diodes illustrated in conjunction with other embodiments described herein) may be formed as monolithic arrays each bonded to an associated scintillation layer with an epoxy that is transparent to the wavelength of light generated within the scintillation layer. As used herein, a monolithic array or layer is one formed of a continuous mass of the same material. For example, a monolithic array of diodes can be formed on a silicon crystal wafer.

Within each scintillation layer the flux from the x-ray source 14 decreases as an exponential function of the layer thickness. Assuming, for example, that each array is formed of the same scintillation material, e.g., cadmium tungstate, the scintillation layer 70 need only have a thickness on the order of 0.2 mm to absorb approximately 50 percent of the incoming flux from a 140 kvp source spectrum. For the second detector array 52*a* to absorb 95 percent or more of the x-ray flux transmitted through the first detector array 50*a*, the scintillation layer 80 should have a thickness on the order of 2.6 mm or more. For various embodiments of the detector system (18*a*, 18*b*, and 18*c*), the relative absorption of x-ray energy among multiple scintillation layers may vary considerably. For example, the first scintillator layer 70 could be even thinner than 0.2 mm (e.g., 0.1 mm or less) and may be formed of other scintillator material such that it absorbs less than 10 percent of the total x-ray flux passing into it. The second scintillator layer 80 may be composed of like or different scintillator material and sized to capture 95 percent or more of the flux transmitted through the first scintillator layer 70.

More generally, the thickness of the first scintillator layer 70 is less than 0.5 mm and, preferably, less than 0.2 mm. According to aspects of the invention, the thickness (i.e., measured along the direction of the arrows 54) of the scintillator layer 70 is small enough that a high resolution signal may be obtained primarily based on the capture field and pitch of the diodes 74, and without formation of the scintillation layer 70 with singulated elements.

Because the scintillator layer 70 is relatively thin, scintillation light, which enters the diodes 74 to generate electrical signals, primarily propagates from the scintillator layer 70 into a closest underlying diode 74. Thus each diode 74 receives, as a primary source of scintillation light, the light generated in the region of the scintillator layer 70 immediately in front of that diode 74, i.e., relative to the direction of x-ray travel along the arrows 54. Little or no scintillator light generated in the scintillator layer 70 propagates to others of the diodes 74 than the diode immediately behind the position at which the light is generated. Consequently there is little "cross talk" noise in signals generated by the diodes, and the scintillator layer 70 can function without the incorporation of a reflective matrix. The combination of each diode 74 and the adjoining region of the scintillator layer 70 which primarily contributes scintillator light to that diode constitutes a detector element 78 of the scintillator layer 70. An exemplary detector element 78 is shown in FIG. 3.

With the scintillation layer 70 having a 0.2 mm thickness, the scintillator layer 70 can provide an imaging resolution on the order of 0.5 mm with an acceptable level of cross talk. The array of diodes 74 has a uniform spacing consistent with this exemplary resolution, i.e., a pitch of 0.5 mm on center. The diodes 74 of the first detector array 50*a* are shown in FIG. 3 to have approximately one half the pitch as the diodes 86 of the second detector array 52*a*, being spaced approximately one mm on center. With this arrangement, two diodes 74 in adjacent columns along the row of the first detector array 50*a* illustrated in FIG. 3, and two diodes 74 in an adjacent row and the same two columns of the first detector array 50*a*, together, will subtend substantially the same solid angle of x-ray flux as one element in the second detector array 52*a*.

It will be understood to those skilled in the art that the indirect conversion layer of FIG. 3 could be replaced with a monolithic direct conversion sensor array. Such a direct conversion layer will serve the combined function of the scintillator and diode arrays, that of converting x-rays to electrical signals in each layer. Systems with one indirect and one direct conversion layer are also desirable. In particular, the use of a direct conversion layer, in the place of the first detector array 50*a*, is desirable because the crosstalk is less than for a monolithic indirect conversion layer of the same thickness. The materials for direct conversion x-ray sensors may include Cadmium Telluride or Cadmium Zinc Telluride. These materials have similar stopping power as scintillator materials and the thickness in each layer may be substantially as described herein.

The two-layered construction also enables energy discrimination. For each capture element or solid angle element, two energy bins are provided by signals from the two layers. Signals generated by x-ray absorption in the first layer correspond to a low energy and signals generated by x-ray absorption in the second layer correspond to a high energy. As known in the art, generating signals configured to segregate x-rays into two energy bins can provide information to create material decomposition of the raw data sinogram and a characterization of the object composition.

Another feature of the invention is illustrated in FIG. 4, wherein the detector system 18*b* comprises first detector array 50*b* and a second detector array 52*b* with each array containing detector elements of a different design. As described for the array 50*a* of the detector system 18*a*, above the first detector array 50*b* comprises a first, relatively thin and continuous (monolithic) scintillation layer 70. An array of diodes 96 is positioned to receive light generated within the scintillation layer 70. The second detector array 52*b*, as described for the second detector array 52*a* of the detector system 18*a*, comprises a second, relatively thick scintillation layer 80 formed of separate scintillator elements 82 having conventional reflectors 84 formed at each interface between the scintillator elements 82. An array of diodes 86 is positioned to receive light generated within the scintillation layer 80.

The diodes 96 of the first detector array 50*b* and the diodes 86 of the second detector array 52*b* are of the same size and pitch (consistent with the width of the scintillator elements 82) such that each array 50b and 52b is capable of providing the same image resolution. Although the diodes in each array 50b and 52b have the same pitch, they are offset from one another. That is, the capture fields of elements in different arrays have a staggered alignment with respect to one another along the image plane 21 and along the fan direction, i.e., the direction of gantry rotation about the center point 24. This offset allows each array 50b and 52b to receive a different view of the patient 22. Together, the two arrays 50b and 52b provide an increased number of non-redundant data samples for image reconstruction. Sinograms computed from these data can be combined to effect higher image resolution than achievable with one array having the same detector width and pitch. The offset between detectors in different layers may, for example, be one fourth or one half of the pitch. The offset is particularly beneficial if a full rotation reconstruction is performed with the two layer detector having a one-half pitch between layers and one quarter angular offset of the detector centerline in the gantry system. A one half offset of detector elements in the two arrays would improve image resolution with one half gantry rotation and reconstruction.

In the embodiment of FIG. 5 the detector system 18c comprises a first detector array 50c and a second detector array 52c with each array containing detector elements of a different design. As described for the first detector array 50a of the detector system 18a and for the second detector array 50b of the detector system 18b, the first detector array 50c comprises the first, relatively thin and continuous scintillation layer 70. An array of individual diodes 106 is positioned to receive light generated within the scintillation layer 70. The second detector array 52c, as described above for the first detector array 52a of the detector system 18a and for the second detector array 52b of the detector system 18b, comprises the second, relatively thick scintillation layer 80 formed of separate scintillator elements 82 having conventional reflectors 84 formed at the interfaces between each of the scintillator elements 82. An array of diodes 86 is positioned to receive light generated within the scintillation layer 80. The exemplary diodes 106 of the first detector array 50c are of the same width and arranged at the same pitch as the diodes 86 and are each in full alignment with the scintillator elements 82 and the associated diodes 86.

A matrix of collimators 110 is interposed between the first and second detector arrays 50c and 52c to remove the scatter energy before x-ray flux reaches the second detector array 52c. An estimate of the scatter component is obtained from the difference in signals acquired from the first and second detector arrays 50c and 52c after proper gain calibration of the two arrays, and based on nearly scatterless imaging of the second detector array 52 (as effected by the presence of the collimator array 110) and conversely the presence of scatter in the first detector array 50. The scatter estimate is subsequently used to correct signals generated by the first and second detector arrays 50c and 52c before reconstructing the CT image.

With the multiple diodes 106 and 86 having the same detector width and pitch, each array 50c and 52c is capable of providing the same image resolution. The detector system 18c may be readily modified to include a staggered alignment between elements of the two detector arrays 50c and 52c (as in the detector system 18b) or to include smaller detector widths (and finer pitch) in the first detector array 50c (such as described for the detector system 18a). The scatter-corrected reconstructed image may be derived from a combination of signals from both detector arrays 50c and 52c or may be a scatter-corrected reconstructed image derived from one higher resolution image array.

Figure 6:
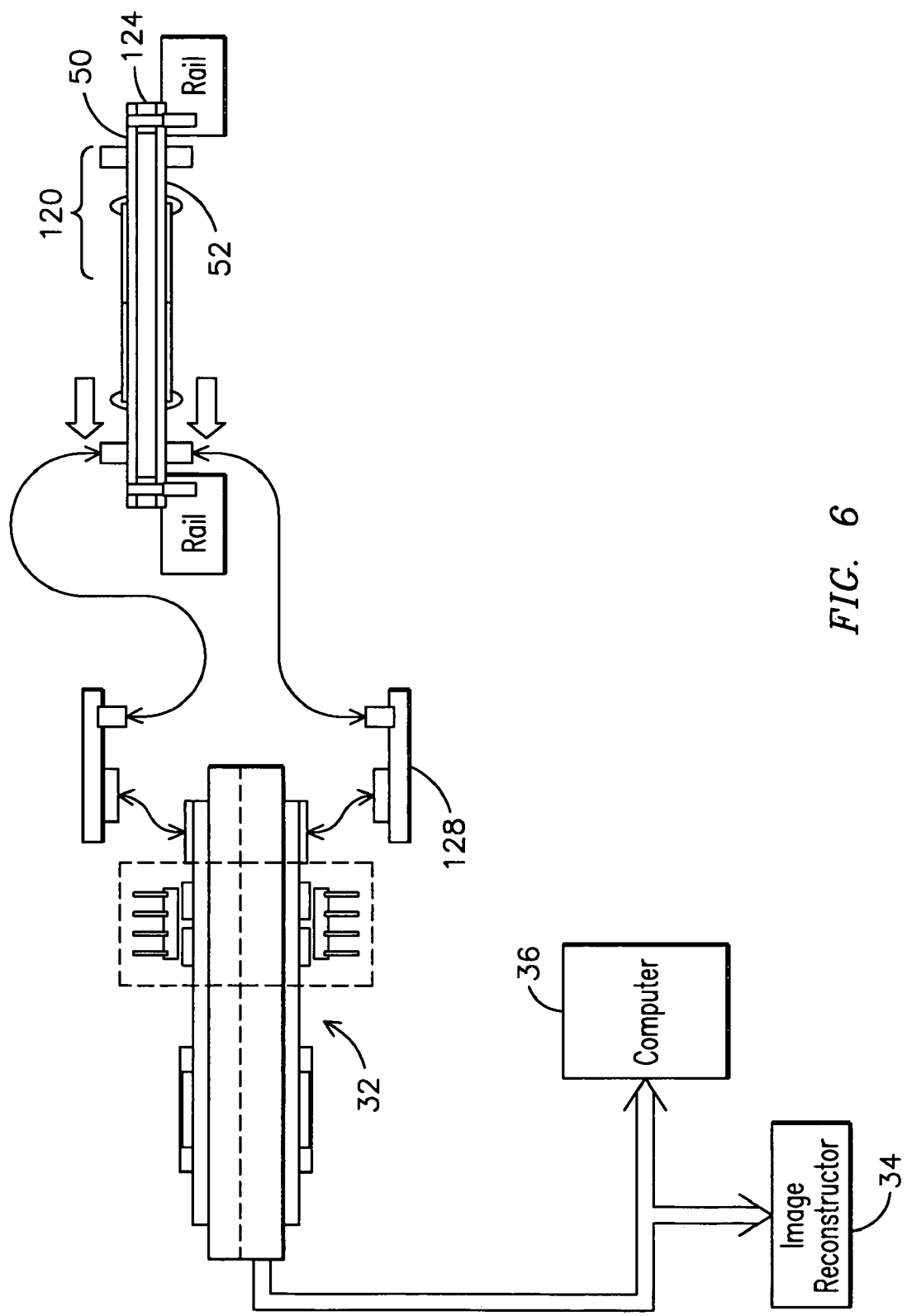
FIG. 6 illustrates an assembly for implementing features of the invention in the system of FIG. 1.

FIG. 6 illustrates an exemplary implementation of the detector system 18 in the CT imaging system 10. Array units 120, each comprising a pair of the first detector array 50 and the second detector array 52, are mounted on opposing sides of a circuit board 124. Detector elements in each detector array 50 and 52 are connected through a level adjusting interface board 128 to provide conditioned electrical signals to the data acquisition system 32. By way of example, each of the first detector arrays 50 and the second detector arrays 52 may comprise sixteen rows and sixteen columns of detector elements. When multiple array units 120 are assembled into a series of sixty multiple array units 120, the detector system 18 will comprise sixteen rows and 960 columns of detector elements. This allows for simultaneous collection of sixteen slices of data with each rotation of the gantry 12.

Each diode 74, 96, and 106 receives, as a primary source of scintillation light, the light generated in the region of the layer 70 immediately above the respective diode. Because the scintillation layer 70 is relatively thin, the scintillation light, which generates electrical signals in the array of diodes, primarily propagates into a closest underlying diode. Little or no scintillator light propagates to diodes other than the diode immediately behind the position at which the light is generated. Thus there is little "cross talk" contributing to signals generated by the diodes and the scintillation layer 70 can function without the incorporation of a reflective matrix.

EXEMPLARY FEATURES OF THE INVENTION

Aspects of the present invention overcome limitations associated with relatively thick scintillation layers by providing two scintillation layers wherein the first layer is both continuous (or monolithic) and so thin as to render it unnecessary to incorporate a matrix of reflectors, resulting in more economical manufacture of higher resolution scintillation elements. While it may be preferred to provide a layer thickness on the order of 0.2 mm, in order to capture about 50 percent of the flux in the high resolution layer, even thinner layers, capturing substantially less flux, in conjunction with denser diode arrays (e.g., smaller pitch) can provide higher resolution images. In contrast with systems constructed in accord with the principles of the invention, prior x-ray imaging systems have achieved improved resolution by providing relatively thick scintillation layers with smaller, discrete detector elements. Such discrete detector elements must be isolated from one another with a matrix of reflectors so that the scintillation light will not cross the boundary between adjacent detector elements. In the past this has reduced the effective capture area of each detector element, thereby reducing the signal level. Throughput of each detector element has been further attenuated with multiple reflections of scintillator light by the reflectors. None of this structure is present in the first detector array 50a, for example, formed with a continuous first layer as described herein. The first detector array 50 may be a monolithic direct conversion sensor, instead of a scintillation layer combined with an array of diodes, to further reduce cross-talk between pixels, relative to providing a thin scintillator layer 70 with discrete detector elements.

The invention has been illustrated with reference to exemplary embodiments. The invention may be applied in a single slice or a multi-slice configuration of a CT system. Based on the examples which have been described, many equivalents, alternatives and modifications will be apparent. Accordingly the scope of the invention is only limited by the claims which follow.

The invention claimed is:

1. An imaging system comprising:
   an x-ray source;
   a first detector array including a first array of first diodes disposed on a first scintillation layer of scintillator material for sensing the x-ray source, the first detector array defining a curvilinear image plane and associated x-ray capture fields subtending predefined solid angles of flux from the x-ray source, two or more of the first diodes having a combined geometric area defining a capture field corresponding to a predefined solid angle of flux, each capture field being an effective x-ray sensing area at a position along the curvilinear image plane; and
   a second detector array including a second array of second diodes disposed on a second scintillation layer of the scintillator material, wherein each second diode subtends a solid angle substantially equal to the predefined solid angle of flux, the second scintillation layer positioned to absorb a portion of the x-rays transmitted from the x-ray source and passing through the first scintillation layer.

2. The imaging system of claim 1 further comprising:
   a data acquisition system for converting into digital signals data received from the first array of first diodes and the second array of second diodes; and
   reconstructor circuitry for generating a reconstructed image from the digital signals.

3. The imaging system of claim 1 wherein the first scintillation layer comprises a thickness of approximately 0.2 mm to 0.5 mm.

4. The imaging system of claim 1 wherein the first scintillation layer comprises cadmium tungstate.

5. The imaging system of claim 1 wherein the first scintillator layer comprises a thickness thinner than a thickness of the second scintillation layer.

6. The imaging system of claim 1 wherein the first detector array comprises one of a linear array of first diodes and a two-dimensional array of first diodes.

7. The imaging system of claim 1 wherein the first detector array is disposed within one millimeter of the second detector array.

8. The imaging system of claim 1 wherein the signals generated by x-ray absorption in the first scintillation layer and the second scintillation layer are segregated into two energy bins.

9. The imaging system of claim 1 further comprising a circuit board, wherein the first detector array and the second detector array are mounted on opposing sides of the circuit board.

10. The imaging system of claim 9 further comprising a level adjusting interface board for providing conditioned electrical signals to a data acquisition system.

11. The imaging system of claim 9 wherein the first detector assembly comprises a two-dimensional array of sixteen columns and sixteen rows of the first diodes.

12. An imaging system comprising:
    an x-ray source projecting a beam of x-rays;
    a first detector array including a first array of first diodes disposed on a first scintillation layer of scintillator material for sensing the beam of x-rays, the first detector array defining a curvilinear image plane and associated x-ray capture fields subtending predefined solid angles of flux from the x-ray source, two or more of the first diodes combined subtending a corresponding predefined solid angle of flux, each capture field being an effective sensing area for the beam of x-rays at a position along the curvilinear image plane;
    a second detector array including a second array of second diodes disposed on a second scintillation layer of the scintillator material, each second diode subtending a solid angle substantially equal to the predefined solid angle of flux, the second scintillation layer positioned to absorb at least a portion of that part of the beam of x-rays passing through the first scintillation layer; and
    a plurality of reflectors disposed within the second scintillator layer to reflect x-rays into the second array of diodes.

13. The imaging system of claim 12 further comprising a plurality of collimators disposed between the first array of diodes and the second scintillation layer, the plurality of collimators disposed to reflect x-rays into the second detector array.

14. The imaging system of claim 12 wherein the second scintillation layer comprises a plurality of separate scintillator elements.

15. The imaging system of claim 14 wherein the plurality of reflectors are formed at interfaces between the separate scintillator elements.

* * * * *

UNITED STATES PATENT AND TRADEMARK OFFICE
CERTIFICATE OF CORRECTION

PATENT NO. : 7,696,481 B2  Page 1 of 1
APPLICATION NO. : 11/286122
DATED : April 13, 2010
INVENTOR(S) : Tkaczyk It is certified that error appears in the above-identified patent and that said Letters Patent is hereby corrected as shown below:

In Column 5, Line 42, delete "(18a, 18b, and 18c)," and insert -- 18a, --, therefor.

In Column 6, Line 32, delete "in the place of" and insert -- for --, therefor.

In Column 6, Line 51, delete "first" and insert -- a first --, therefor.

In Column 6, Line 54, delete "above" and insert -- above, --, therefor.

In Column 9, Lines 32-33, in Claim 3, delete "approximately 0.2 mm to" and insert -- less than --, therefor.

Signed and Sealed this

Twenty-ninth Day of June, 2010

David J. Kappos
*Director of the United States Patent and Trademark Office*